(12) United States Patent
Yamakawa

(10) Patent No.: US 7,170,550 B2
(45) Date of Patent: Jan. 30, 2007

(54) TELEVISION DATA MANAGEMENT SYSTEM

(75) Inventor: Toru Yamakawa, Las Californias Mexicali (MX)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 168 days.

(21) Appl. No.: 10/864,117

(22) Filed: Jun. 9, 2004

(65) Prior Publication Data
US 2005/0018047 A1 Jan. 27, 2005

Related U.S. Application Data

(63) Continuation-in-part of application No. 10/801,991, filed on Mar. 16, 2004.

(60) Provisional application No. 60/541,336, filed on Feb. 3, 2004, provisional application No. 60/485,049, filed on Jul. 3, 2003.

(51) Int. Cl.
*H04N 17/00* (2006.01)
(52) U.S. Cl. ..................................... 348/189
(58) Field of Classification Search ........ 348/180–192; 714/724
See application file for complete search history.

(56) References Cited

U.S. PATENT DOCUMENTS

| | | | |
|---|---|---|---|
| 4,485,394 A | 11/1984 | Ghaem-Maghami et al. | 358/10 |
| 4,593,308 A | 6/1986 | Kemplin | 358/10 |
| 4,757,239 A | 7/1988 | Starkey, IV | 315/371 |
| 4,759,123 A * | 7/1988 | Ohta et al. | 29/832 |
| 4,857,998 A | 8/1989 | Tsujihara et al. | 358/60 |
| 5,216,504 A | 6/1993 | Webb et al. | 358/139 |
| 5,506,481 A | 4/1996 | Wada et al. | 315/368.12 |
| 5,873,759 A * | 2/1999 | Ball et al. | 445/3 |
| 5,969,756 A | 10/1999 | Buckley et al. | 348/190 |
| 5,995,162 A | 11/1999 | Fujimori | 348/569 |
| 6,014,168 A * | 1/2000 | Webb et al. | 348/190 |
| 6,018,361 A | 1/2000 | Fujii et al. | 348/180 |
| 6,058,221 A | 5/2000 | Bukal et al. | 382/286 |
| 6,111,243 A * | 8/2000 | Lara | 250/208.1 |
| 6,252,626 B1 * | 6/2001 | Buckley et al. | 348/189 |
| 6,285,397 B1 | 9/2001 | Webb et al. | 348/189 |
| 6,340,988 B1 | 1/2002 | Jeon | 348/180 |
| 6,437,522 B1 * | 8/2002 | Moon et al. | 315/368.13 |
| 6,449,632 B1 | 9/2002 | David et al. | 709/202 |
| 6,460,018 B1 | 10/2002 | Kasai et al. | 705/8 |
| 6,606,116 B1 | 8/2003 | Poynter | 348/189 |
| 6,690,818 B2 | 2/2004 | Ahn | 382/141 |
| 6,798,444 B2 * | 9/2004 | Adan | 348/189 |
| 2002/0047903 A1 | 4/2002 | Shibuya et al. | 348/190 |
| 2002/0077882 A1 | 6/2002 | Nishikawa et al. | 705/10 |
| 2002/0097337 A1 * | 7/2002 | Bin Adan | 348/553 |
| 2002/0156668 A1 | 10/2002 | Morrow et al. | 705/8 |
| 2002/0188460 A1 | 12/2002 | Resh | 705/1 |
| 2003/0028836 A1 * | 2/2003 | Maeda et al. | 714/724 |
| 2003/0098930 A1 | 5/2003 | Seo et al. | 348/806 |
| 2003/0191679 A1 | 10/2003 | Casati et al. | 705/8 |
| 2005/0012820 A1 * | 1/2005 | Yamakawa | 348/189 |
| 2005/0018047 A1 * | 1/2005 | Yamakawa | 348/189 |

* cited by examiner

OTHER PUBLICATIONS

U.S. Appl. No. 09/561,496.

*Primary Examiner*—Paulos M. Natnael
(74) *Attorney, Agent, or Firm*—John L. Rogitz

(57) ABSTRACT

Information about various adjustments made to TVs during assembly is entered into a database after each adjustment, to facilitate monitoring and reporting of the assembly process, so that corrective action when appropriate can be taken more quickly.

12 Claims, 4 Drawing Sheets process flow

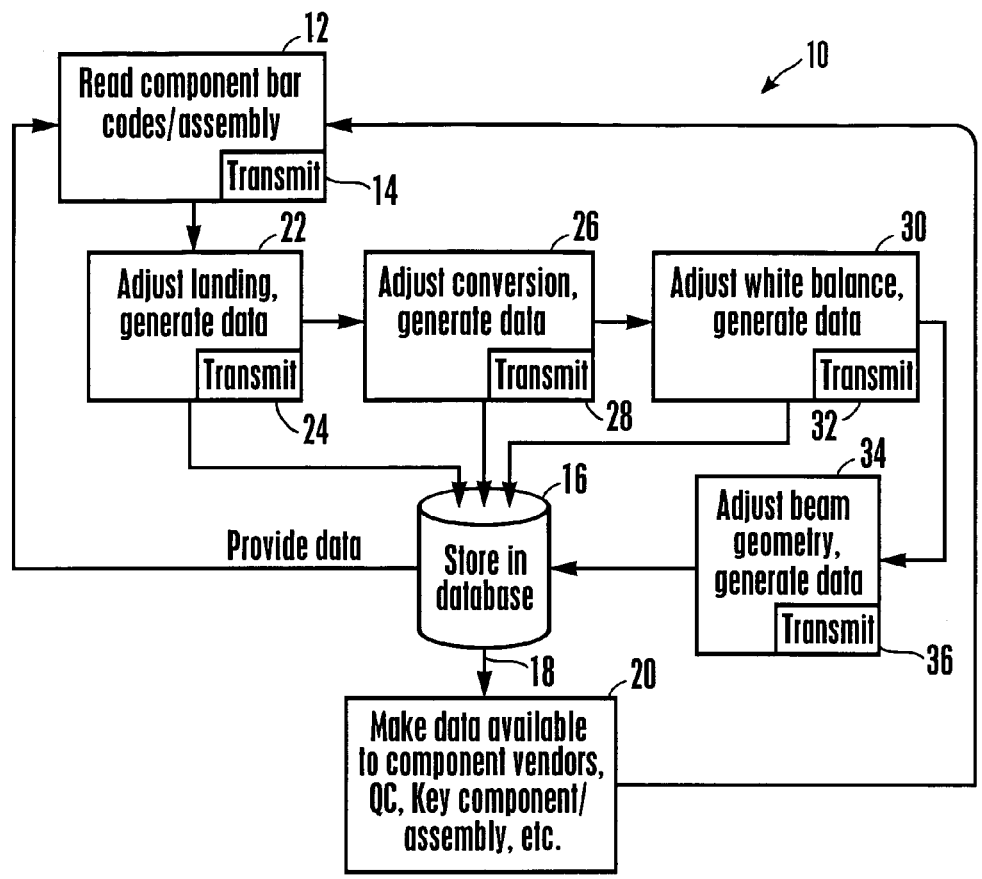
Figure 1 process flow
Figure 2 data structure

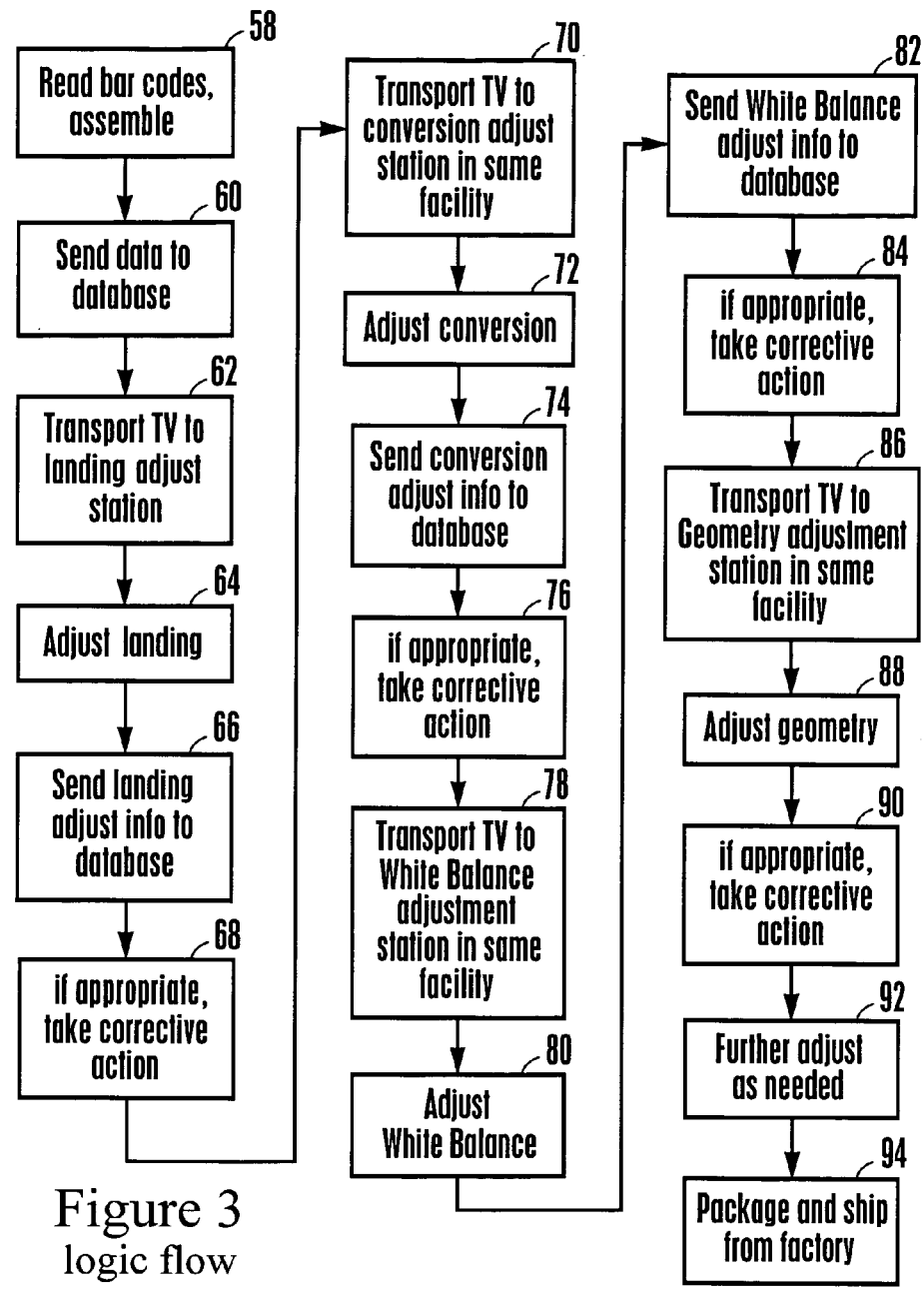
Figure 3
logic flow
Figure 4 uploading/monitoring/reporting logic
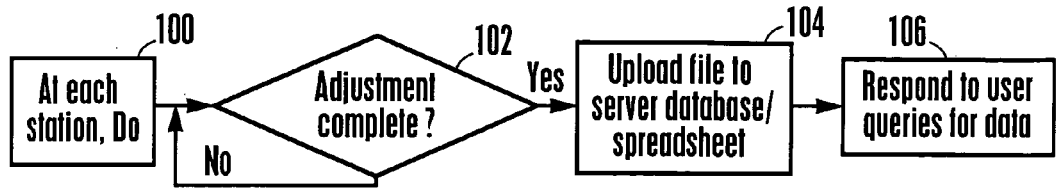

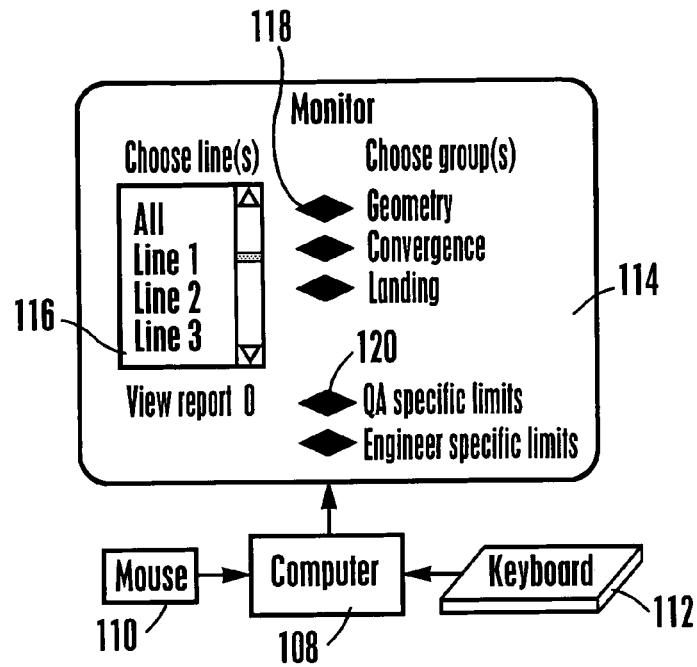
Fig. 5 initial supervisor screen
Fig. 6 detailed supervisor screen

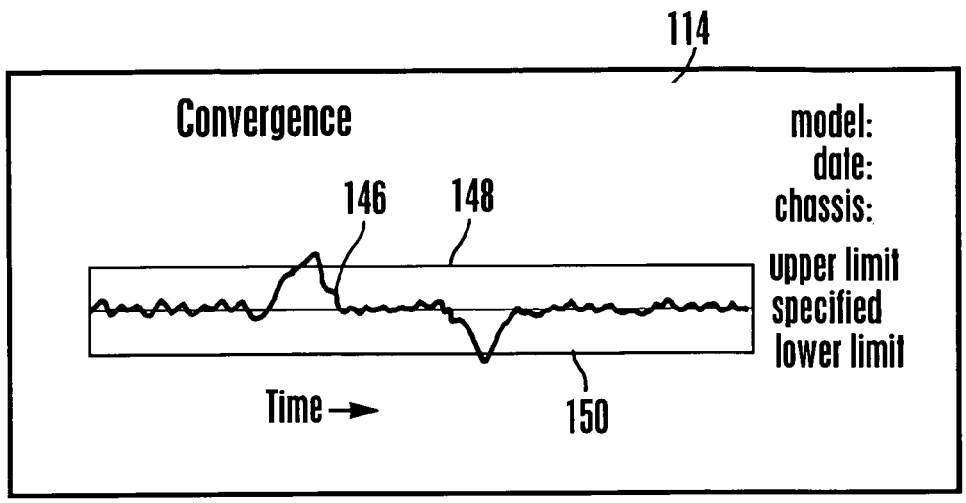
Fig. 7  example report graph
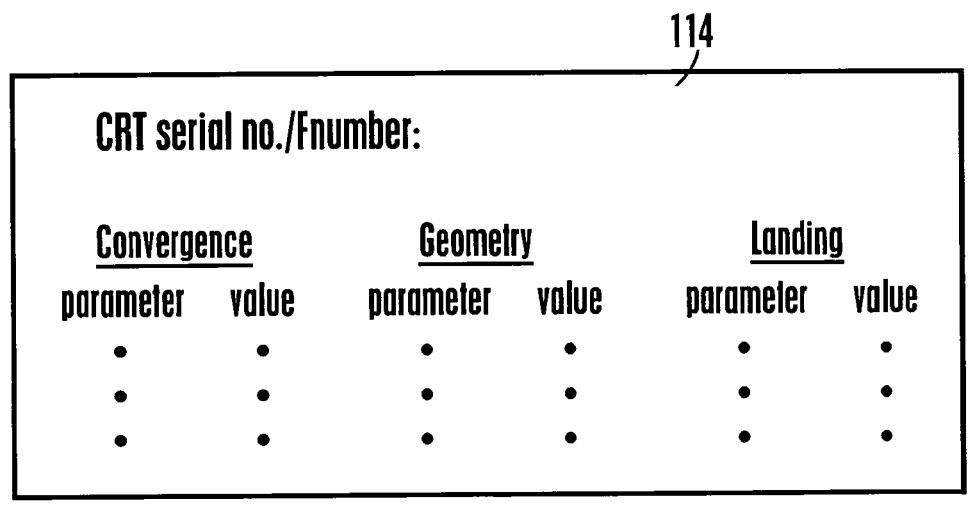
Fig. 8  example report chart
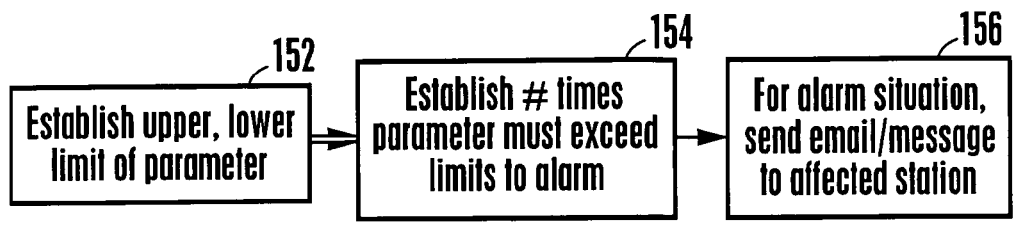
Fig. 9  alarm logic

TELEVISION DATA MANAGEMENT SYSTEM

RELATED APPLICATIONS

This application is a continuation-in-part of and claims priority to U.S. patent application Ser. No. 10/801,991, filed Mar. 16, 2004 and it also claims priority from U.S. provisional patent application Ser. Nos. 60/485,049, filed Jul. 3, 2003 and 60/541,336 filed Feb. 3, 2004.

I. FIELD OF THE INVENTION

The present invention relates generally to processes for assembling televisions.

II. BACKGROUND

In a conventional process for manufacturing a cathode ray tube ("CRT") monitor, an integrated tube component ("ITC") is assembled. The ITC includes a CRT, a deflection yoke ("DY"), and typically one or more magnets or permalloy components. The construction and operation of CRTs and DYs are well known in the art. In manufacturing, the DY is mounted on the CRT. The location where an electron strikes the front panel of the CRT is referred to as "landing position." For desirable performance of the monitor and image quality, electrons in the CRT should have landing positions within defined locations or regions, such as phosphor stripes on the front panel of the CRT. The position of the DY is adjusted during the assembly process as needed, to adjust the landing position of electrons in the CRT. The DY is then fixed in place on the CRT.

In addition to striking desired locations in the CRT, electrons should strike at desired times to provide unified dots of color in the image. When the electrons forming the colors of a dot do not strike the phosphor of the panel within the correct time frames, the colors may not blend properly resulting in a undesirable image. This timing problem is referred to as "misconvergence." Timing synchronization is referred to as "convergence." Proper convergence provides a desirable image. Accordingly, magnets can be applied to the CRT, as needed, to adjust convergence in the CRT. In another process, convergence circuitry in the CRT-DY assembly can be employed to adjust convergence using internal data register control. While convergence can be controlled by the CRT-DY assembly, there may be differences between specific CRT-DY assemblies in their performance relative to specified tolerances. For example, variations in material composition or component construction may cause these differences. The above techniques can be used to compensate for these differences and correct the convergence of the monitor.

Additional adjustments can be made during assembly, including adjusting the geometry of the electron beam and adjusting the white balance of the display.

As recognized herein, in conventional assembly processes, information about the adjustments made along the assembly line is not immediately made available to other members of the assembly team. Instead, adjustment data ordinarily is entered manually into a database post-adjustment, at the end of the assembly process. This means that information regarding a potentially defective lot of a particular component or potentially defective (or particularly effective) assembly techniques may be based on a small sample and moreover are not made available to supervisory personnel for potentially lengthy periods of time, preventing the rapid correction of problems by assembly line managers and/or component vendors.

SUMMARY OF THE INVENTION

A television (TV) assembly process includes sending, from an assembly line station, data regarding TV adjustments to a data store. The process also includes accessing the data store to monitor an assembly process by displaying reports, the contents of which are specified by a user. The reports may be graphical or chart-like.

In a non-limiting embodiment, the process may further include establishing upper and lower limits for a parameter such as geometry, convergence, and landing that is subject to adjustment at the assembly line station. An alarm condition may be defined based on a number of times a limit is violated, and if an alarm condition is satisfied a message may be sent to an affected assembly line station. A supervisory screen can be used to define the content of the report.

In another aspect, a TV assembly facility has plural adjustment stations that in turn include associated processors which send information related to adjustments of TVs to a data store. The information is sent substantially immediately after each adjustment has been satisfactorily completed. A supervisory computer can access the data store and can facilitate user requests for reports which contain data in the data store, such that a user of the supervisory computer can monitor the operation of the assembly line.

In yet another aspect, a supervisory computer includes means for accessing a data store holding information representing adjustments of TVs in an assembly line. The computer also has means for inputting a request for a report containing information from the data store. Means are provided for displaying the report. The report displays information pertaining to geometry adjustments and/or landing adjustments and/or convergence adjustments in substantially real time with the completion of the adjustments.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a block diagram of the one process flow;

FIG. 2 is a schematic diagram of an exemplary data structure;

FIG. 3 is a flow chart of one embodiment of logic;

FIG. 4 is a flow chart of the logic for uploading adjustment data from the line stations to the database, for monitoring the assembly process using the screens of FIGS. 5 and 6, and for reporting status of the process using the screens in FIGS. 7 and 8;

FIG. 5 is a block diagram of a manager computer station, showing an initial supervisor screen shot;

FIG. 6 is a schematic diagram of a detailed supervisor screen shot;

FIG. 7 is a schematic diagram of a graphical report;

FIG. 8 is a schematic diagram of a chart report; and

FIG. 9 is a flow chart of the alarm logic.

DETAILED DESCRIPTION OF THE PREFERRED EMBODIMENT

Referring initially to FIG. 1, a system is shown, generally designated 10, for assembling TVs preferably in a single facility. The TVs can be cathode ray tube TVs, flat panel TVs, plasma TVs, etc.

As shown, the system 10 includes an assembly line that has at least one assembly/bar code reader station 12 where components of a TV are assembled while reading (with, e.g., a conventional bar code reader that is part of the assembly station 12) their bar codes, which can indicate component serial number, lot number, manufacturer, etc. The serial numbers read may be serial numbers of, e.g., the deflection yoke used in the TV, the printed wire board used, the CRT used, etc.

The TV itself may have a TV identification. In any case, the bar code information is sent by a wired or wireless transmitter 14, such as a computer modem, etc. to a data store 16, which can be a relational database or file system. The data store 16 is accessible over an intranet 18 to managers, component vendors, quality control personnel, etc. 20 for purposes to be shortly disclosed.

After assembling the TV and sending the bar code information to the data store 16, the TV is transported to a landing adjust station 22, where the landing of the TV is adjusted as necessary in accordance with principles known in the art. Information regarding the characteristics of the landing adjustment is sent by a wired or wireless transmitter 24 to the data store 16. According to the present invention, adjustment information can be manually or automatically loaded into a processor associated with an adjustment station for transmission to the data store 16. The landing adjust station 22 can include a Wolf machine running, e.g., Windows 98®.

After or simultaneously with sending the landing adjustment information to the data store 16, the TV is transported to a conversion adjust station 26, where the conversion of the TV is adjusted as necessary in accordance with principles known in the art. Information regarding the characteristics of the conversion adjustment is sent by a transmitter 28 to the data store 16. The conversion adjust station 26 can include a Wolf machine running, e.g., Windows 98®.

After or simultaneously with sending the conversion adjustment information to the data store 16, the TV is transported to a white balance adjust station 30, where the white balance the TV is adjusted as necessary in accordance with principles known in the art. Information regarding the characteristics of the white balance adjustment is sent by a transmitter 32 to the data store 16. The white balance adjust station 30 can include a Wolf machine running, e.g., Windows 98®.

After or simultaneously with sending the white balance adjustment information to the data store 16, the TV is transported to a electron beam geometry adjust station 34, where the electron beam geometry the TV is adjusted as necessary in accordance with principles known in the art. Information regarding the characteristics of the electron beam geometry adjustment is sent by a transmitter 36 to the data store 16. The geometry adjust station 34 can include a Wolf machine running, e.g., Windows 98® or a so-called "AD" machine running, e.g., Windows 95®. A "Sam" machine can also be included in the line to adjust color, contrast, hue, and the parameter known as "G2".

With the above inventive concepts, real time data regarding assembly line performance and component batch quality is made available to both assembly line managers and component suppliers 20, integrating the production enterprise and increasing picture quality and maintenance response while reducing adjustment cycle time and assembly delays. That is, the entities 20 can immediately effect corrective action before a particular TV has completed the adjustment process by, e.g., replacing a defective lot of deflection yokes at the assembly station 12 immediately after landing adjustment, or by warning assembly line personnel (at, e.g., the assembly station 12) of defective assembly practices based on excessive adjustments before all adjustments are made. Such warnings may be generated when components require adjustment to remain within a six-sigma (6-σ) tolerance band.

FIG. 2 shows a data structure 38 that can be used to store the information discussed above in the data store 16. The data structure 38 may be implemented, e.g., in a file system spreadsheet or by one or more tables in relational database. For instance, the data store 16 can be implemented in an Oracle® spreadsheet.

As shown, the data structure 38 can include a TV identification column 40 that can be populated by serial number information read from bar codes on a TV chassis or CRT at the assembly station 12. Other columns having information populated by reading bar codes at the assembly station 12 can include a deflection yoke serial number column 42 and if desired a deflection yoke lot number column 44, representing the manufacturer's lot number. This information can be used to identify a potentially defective lot of deflection yokes. Additional component serial number and lot number columns 46, 48 can be provided to store serial numbers and lot numbers of, e.g., printed wire boards associated with the TV ID in column 40, etc.

Continuing the description of the exemplary data structure 38 shown in FIG. 2, adjustment information columns 50–56 can be provided to correlate information regarding various adjustments with associated TV and component information in columns 40–48. More specifically, a landing adjustment information column 50 can be populated with information related to adjustments made to the TV identified in column 40 at the landing adjustment station 22. Also, a conversion adjustment information column 50 can be populated with information related to adjustments made to the TV identified in column 40 at the conversion adjustment station 26. Further, a white balance adjustment information column 50 can be populated with information related to adjustments made to the TV identified in column 40 at the white balance adjustment station 30. And, an electron beam geometry adjustment information column 50 can be populated with information related to adjustments made to the TV identified in column 40 at the electron beam geometry adjustment station 34.

Now referring to FIG. 3, for each TV being assembled, at block 58 the bar codes of the TV and the above-mentioned components are read as the TV is assembled. At block 60, the data is immediately sent to the data store 16 for storage in the data structure 38. Then, at block 62 the TV is transported to the landing adjust station 22.

Proceeding to block 64, the landing is adjusted as necessary, and information related to the landing adjustment preferably is immediately sent to the data store 16 at block 66 for storage in the data structure 38. If needed, corrective action may be taken at block 68. For instance, if adjustment was necessary to bring the landing within, e.g., a six-sigma tolerance band, the lot of the deflection yoke may be inspected, particularly if several TVs in a row violate the six-sigma band. Or, an alarm might sound. The alarm can be implemented by sending emails detailing the out-of-specification condition to personnel manning affected stations.

Personnel training may be implemented. Still further, since the data is immediately available to vendors 20 accessing the data store 16, the vendor of, e.g., faulty deflection yokes is immediately alerted to defects.

Once the landing adjustment information is sent to the data store 16 and/or once corrective action is taken, the logic moves to block 70, wherein the TV is transported to the conversion adjust station 26, usually in the same facility as the landing adjust station 22. Proceeding to block 72, the conversion is adjusted as necessary, and information related to the conversion adjustment preferably is immediately sent to the data store 16 at block 74 for storage in the data structure 38. If needed, corrective action may be taken at block 76.

Once the conversion adjustment information is sent to the data store 16 and/or once corrective action is taken, the logic moves to block 78, wherein the TV is transported to the white balance adjust station 30, usually in the same facility as the landing adjust station 22. Proceeding to block 80, the white balance is adjusted as necessary, and information related to the white balance adjustment preferably is immediately sent to the data store 16 at block 82 for storage in the data structure 38. If needed, corrective action may be taken at block 84.

Once the white balance adjustment information is sent to the data store 16 and/or once corrective action is taken, the logic moves to block 86, wherein the TV is transported to the electron beam geometry adjust station 34, usually in the same facility as the landing adjust station 22. Proceeding to block 88, the geometry is adjusted as necessary, and information related to the geometry adjustment preferably is immediately sent to the data store 16 for storage in the data structure 38. If needed, corrective action may be taken at block 90. Block 92 indicates that further adjustments may be undertaken as necessary, and then the TV is packaged and shipped from the facility 10 at block 94.

FIG. 4 shows the overall uploading, monitoring, and reporting logic of the present invention. Commencing at block 100, each station in the assembly line proceeds to decision diamond 102 to determine whether the relevant adjustments to the TV under test have been satisfactorily completed, and if so the adjustments, which are stored in a file maintained at the station, are immediately and preferably automatically uploaded to the data store 16. At block 106, reports may be generated in response to supervisory queries for adjustment details in accordance with further details below. It can be appreciated that a report reflecting an adjustment can be generated and displayed substantially in real time upon completion of the adjustment, owing to the immediate and automatic upload of the adjustment file from the station to the data store.

More specifically, FIG. 5 shows that a supervisory computer 108, which can access the data store 16 using, e.g., a modem or wireless communication system operably engaged with a local area network or wide area network with which the station processors can also communicate, can include a mouse 110 or other input device and a keyboard 112 for purposes to be shortly disclosed. The computer 108 also has a display monitor 114 which can present various displays and reports as set forth further below.

In the embodiment shown in FIG. 5, an initial supervisory screen shot is shown. As shown, the screen shot can include a line selection window 116 that allows a user to select a particular one of the monitored assembly lines by pointing and clicking the mouse 110. Also, the user may select which general parameter, i.e., geometry, convergence, and landing, to monitor by selecting the appropriate parameter select button 118 using the mouse 110. Further, the user can select which specification limits (when two different sets are provided) by selecting the appropriate specification select button 118 using the mouse 110. For instance, both quality assurance (QA) and engineering specifications may be invokable.

FIG. 6 shows a more detailed supervisory screen that can be displayed on the monitor 114. As shown, the screen in FIG. 6 can include a line selector 122 that features a drop-down menu listing the lines in the plant when a line selector button 124 is clicked. The user may select which assembly line he or she wishes to obtain data on. Similarly, the user can define start and end dates for the desired period to be monitored by selecting dates in drop down date menu bars 126, 128. Also, the user can select the general parameter group (geometry, convergence, and landing) desired to be shown by appropriately manipulating a group selector 130, which produces a drop-down menu of the available parameters for selection. If the user wishes to monitor only a particular TV model and screen size, the user appropriately manipulates type and size selectors 132, 134, which respectively produce drop-down menus showing the available TV types and screen sizes that can be monitored. A chassis type can be selected using a chassis selector 136. Further, if the user knows the CRT serial number and/or number of a particular TV desired to be monitored, these can typed into serial and Number window 138, 140. If a specific period of time is desired to be monitored, the period can be entered using start and end hour and minute drop-down tools 142.

Once a user has selected a particular parameter to monitor, the computer 108 accesses the data store 16 shown in FIG. 1 to produce relevant reports. FIG. 7 shows a non-limiting example of one such report in graphical form. As shown in FIG. 7, a user has elected to monitor convergence, and a graph line 144 showing various convergence readings as a function of time for a particular TV, model, chassis, or date is displayed, along with upper and lower limits 146, 148. Or, a chart-like report can be displayed as shown in FIG. 8 for a single TV (by CRT serial number or Number). The report shown in FIG. 8 can include the general parameters mentioned above and, under each general parameter, specific constituent sub-parameters along with their numeric values.

As disclosed above, upper and lower limits for each parameter for each model may be established, and this is indicated at block 152 in FIG. 9. These limits may be graphically displayed as shown in FIG. 7. Additionally, at block 154 in FIG. 9 a user may wish to define the number of times a limit can be violated to cause an alarm. At block 156, in the event that an alarm situation has occurred, an alarm can be generated. In one non-limiting implementation the alarm may include sending a message, such as an email or instant message, to the stations affected by the alarm, so that personnel can take immediate corrective action.

While the particular TELEVISION DATA MANAGEMENT SYSTEM as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A television (TV) assembly process, comprising:
   sending, from a station in an assembly line, data regarding TV adjustments to a data store; and
   accessing the data store to monitor an assembly process at least in part by displaying at least one report, the content of the report being specified by a user of a supervisory computer in the assembly line, the report pertaining to at lease one adjustable parameter selected from the group consisting of convergence and landing.

2. The process of claim 1, further comprising establishing upper and lower limits for at least one parameter subject to adjustment at the assembly line station.

3. The process of claim 2, further comprising defining an alarm condition based at least in part on a number of times a limit is violated.

4. The process of claim 3, further comprising sending a message to at least one assembly line station if an alarm condition is satisfied.

5. The process of claim 1, wherein the report graphically shows at least one parameter subject to adjustment at the assembly line station.

6. The process of claim 1, wherein the report shows at least one chart of at least one parameter subject to adjustment at the assembly line station for a single television.

7. The process of claim 1, comprising using a supervisory screen to define the content of the report.

8. A TV assembly facility, comprising:
   plural adjustment stations in at least one assembly line, at least some adjustment stations having associated processors sending information related to adjustments of TVs to a data store substantially immediately after each adjustment has been satisfactorily completed; and
   at least one supervisory computer accessing the data store, the supervisory computer facilitating user requests for reports containing data in the data store such that a user of the supervisory computer can monitor the operation of the assembly line, wherein the supervisory computer facilitates defining alarm limits for at least one parameter selected from the group consisting of convergence and landing.

9. The facility of claim 8, wherein the supervisory computer facilitates defining an alarm condition based at least in part on a number of times a limit is violated.

10. The facility of claim 8, wherein the supervisory computer facilitates sending a message to at least one assembly line station if an alarm condition is satisfied.

11. The facility of claim 8, wherein at least one report graphically shows at least one parameter subject to adjustment at the assembly line station.

12. The facility of claim 8, wherein at least one report shows at least one chart of at least one parameter subject to adjustor at the assembly line station for a single television.

* * * * *